March 17, 1970   R. B. HOPGOOD ET AL   3,501,110
PLASTIC SPOOL AND METHOD OF MAKING SAME
Filed Jan. 24, 1967   2 Sheets-Sheet 1
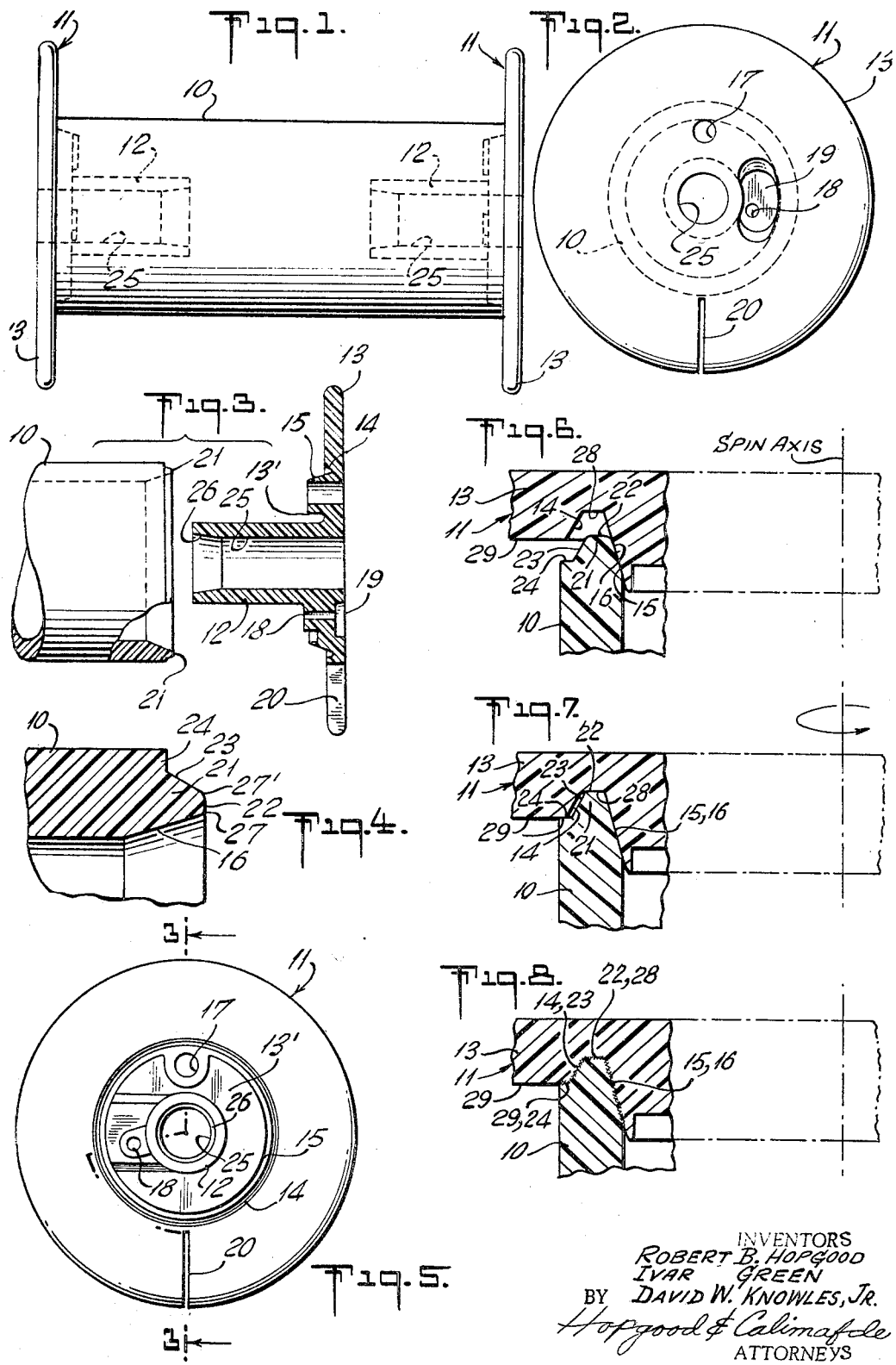
INVENTORS
ROBERT B. HOPGOOD
IVAR GREEN
BY DAVID W. KNOWLES, JR.
Hopgood & Calimafde
ATTORNEYS

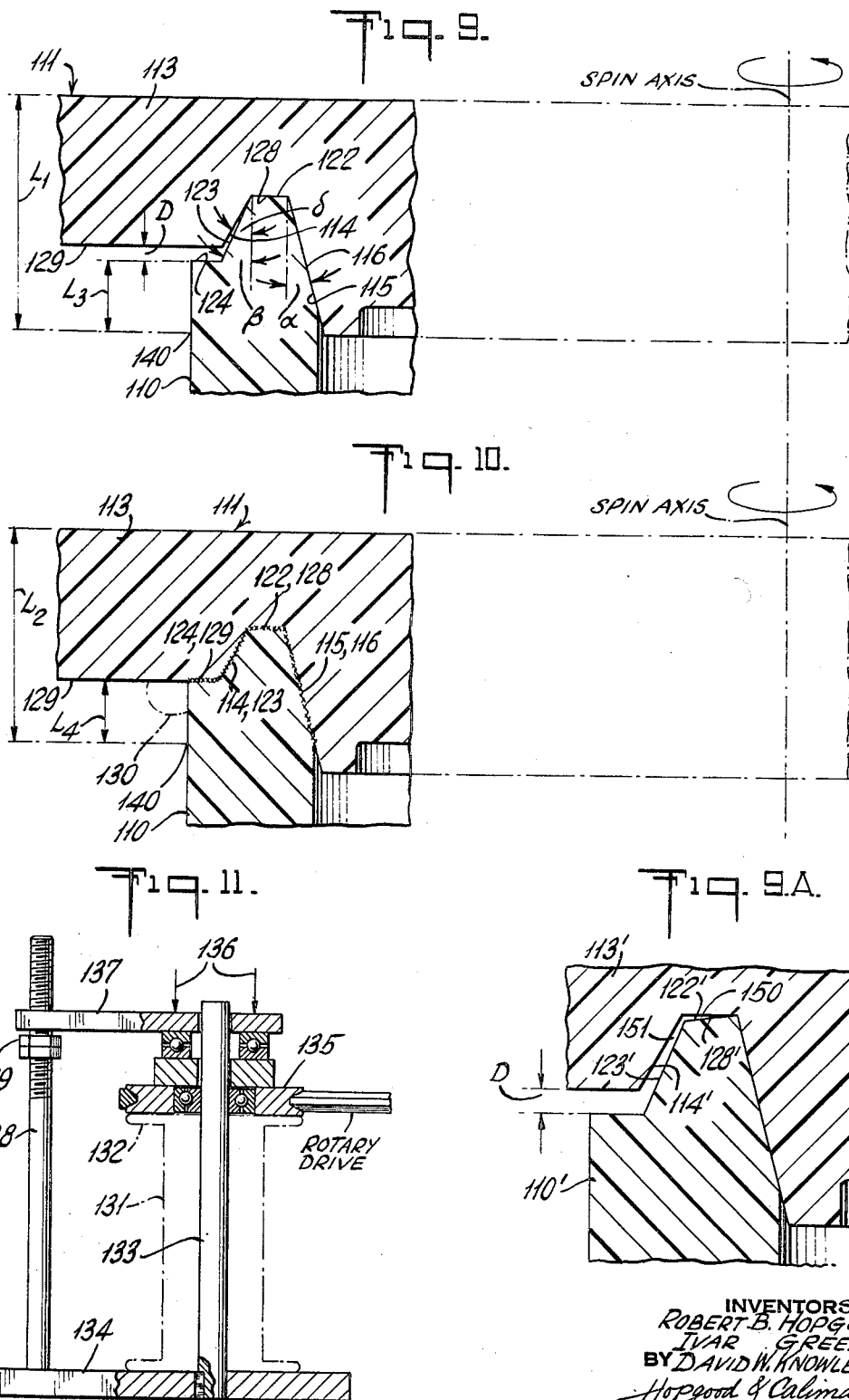

United States Patent Office 3,501,110
Patented Mar. 17, 1970

3,501,110
PLASTIC SPOOL AND METHOD OF MAKING SAME
Robert B. Hopgood, Thompson, Ivar Green, Litchfield, and David W. Knowles, Jr., Danielson, Conn., assignors to Nicholson File Company, a corporation of Rhode Island
Filed Jan. 24, 1967, Ser. No. 622,847
Int. Cl. B65h 75/14
U.S. Cl. 242—118.7     9 Claims

ABSTRACT OF THE DISCLOSURE

The invention contemplates an improved roll, spool, or the like construction featuring the greatest possible use of thermoplastic material and avoiding the disadvantages of a molded assembly. This is achieved by employing two molded end pieces, flanges or hubs appropriately contoured to receive and accurately locate a thin-walled elongated tubular member, secured to and concentrically located on each of the two end hubs. The end hubs are so configurated as to receive and concentrically locate a spindle or shaft and to provide the sole support of the tubular outer surface of the roll or spool, whatever its length. Additionally, the ends of the tubular member, and the cooperating parts of the end flanged hubs are so configurated as not only to achieve an extensive connection upon spin-welded assembly but also to achieve an inherently accurate length determination between end flanges.

---

Reference is made to copending application Ser. No. 540,886, filed Apr. 7, 1966, in the names of Robert B. Hopgood and Ivar E. Green now abandoned, and to application Ser. No. 327,452, filed Dec. 2, 1963, in the name of Robert B. Hopgood, copending with the above mentioned application, and now abandoned.

The invention relates to a tubular construction having application to bobbins, spools, reels and conveyor rolls. It is specifically disclosed in application to a traverse-spool construction as for the accommodation of textile filaments or fibers wound thereon.

Traditionally, traverse spools for the accommodation of delicate fibers and filaments in textile and like processes have been made of spun aluminum or in various assembled combinations of wood and metal. Attempts to produce light-weight plastic spools have been directed to molded configurations and have not thus far solved the problems of achieving the low-cost, light-weight, and durability objectives which necessarily apply in highly competitive operations. In particular, if molded on a vertical axis, the finished spool will have a parting line which extends circumferentially of the spool body, and if molded on a horizontal axis, the finished spool will have a parting line which extends longitudinally of the spool body. In either event, the parting line is intolerable in the handling of many delicate fibers and filaments, and to shave off the parting line in order to create a smooth external surface for accommodating the filaments will involve an expensive additional operation.

It is, accordingly, an object of the invention to provide an improved device of the character indicated.

Another object is to achieve the traditional objects noted above with a thermoplastic assembly and avoiding the undesirable features of molded constructions.

A specific object is to avoid parting lines in a plastic traverse-spool construction.

A general object is to achieve the above objects with a construction in which there is no shrinkage; in which the method of construction lends itself to flexibility of design, so that to achieve a variety of roll or spool shapes and sizes, a minimum tool cost is involved; in which low mass characterizes the structure so that the spool lends itself to high-speed acceleration, rotation, and deceleration; in which precise control of effective axial length may be achieved under mass-production conditions; and in which lightness of weight and resistance to mechanical shock are important characteristics.

Other objects and various further features of novelty and invention will be pointed out or will occur to those skilled in the art from a reading of the following specification, in conjunction with the accompanying drawings. In said drawings, which show for illustrative purposes only, preferred forms of the invention:

FIG. 1 is a view in elevation of a spool incorporating features of the invention;

FIG. 2 is a right-hand view of the assembly of FIG. 1;

FIG. 3 is a fragmentary view showing two of the important components of the structure of FIG. 1 in exploded relation and with the flanged hub in vertical section, the section being taken generally along the line 3—3 of FIG. 5;

FIG. 4 is an enlarged fragmentary view in section revealing the end detail of the elongated tube of the structure of FIG. 1;

FIG. 5 is a left-end elevation of the hub shown in section in FIG. 3;

FIGS. 6, 7 and 8 are enlarged fragmentary sectional views to illustrate progressive stages of achieving the fit of tubular and hub components in accordance with the invention;

FIGS. 9 and 10 are enlarged fragmentary sectional views generally similar to FIGS. 6 and 8, respectively, but illustrating a modification;

FIG. 9A is an enlarged fragmentary sectional view of parts which will be recognized in FIG. 9, but illustrating a still further modification; and FIG. 11 is a simplified view in elevation, partly broken away and in section, schematically illustrating parts of spin-welding mechanism for employment in the method of the invention.

Briefly stated, the invention contemplates an improved roll, spool, or the like construction featuring the greatest possible use of thermoplastic material and avoiding the disadvantages of a molded assembly. This is achieved by employing two molded end pieces, flanges or hubs appropriately contoured to receive and accurately locate a thin-walled elongated tubular member, secured to and concentrically located on each of the two end hubs. The end hubs are so configured as to receive and concentrically locate a spindle or shaft and to provide the sole support of the tubular outer surface of the roll or spool, whatever its length.

Referring to the drawings, the invention is shown in application to a traverse spool comprising an elongated thin-walled cylindrical tube or hollow member 10, secured at both ends to flanged hub members 11. The elongated tube 10 is preferably of extruded thermoplastic material, so that parting lines, drag-off marks and the like can be entirely eliminated and a smooth outer surface presented for non-snagging accommodation of the most delicate fibers and fabrics. The hub members 11 may be duplicates of each other and may be of molded construction. In both cases, the tube 10 and the hub 11 are preferably of thermoplastic material, because such material is inherently suited to the purpose and will not gouge even in the presence of somewhat abusive treatment. Suitable materials include polyamides (such as nylon), polyacetals (such as Delrin and Celcon) and polycarbonates (such as Lexan). Of these materials, the polyacetals are preferred because they are hardest.

Referring to FIG. 3, each of the hub members 11 is shown to comprise an elongated central boss or hub 12 of relatively thin-walled hollow tubular form, integrally joined with a radially outwardly extending flanged portion 13. The flanged part 13 is formed with a circumferentially extending groove 14 facing axially inwardly for reception of the correspondingly configurated end of the tubular member 10, to be accommodated upon assembly. The parts are secured by spin-welding, and for present purposes it suffices to explain that for accurate concentric seating of the tubular member 10 on the hub member 11, the width or thickness of the flange 13 is increased at locations radially inwardly of the tubular member 10, so that an extended shoulder or ledge 15 of slightly tapered configuration may be presented to mate with a similarly flared edge 16 at the end of the tube 10. This thickened portion of the flange 13 is designated 13' in FIG 3 and is shown to be appropriately bored at 17–18 and recessed at 19 for accommodation of fittings and other hardware (not shown) as necessitated by particular applications. For example, a spring clamp device may be retained at 18–19 for fastening an end of a filament to be wound on the spool, and the filament may then be drawn to the spool body through the adjacent radial slot 20 formed at one angular location on the flange 13.

One illustrative juncture of tube 10 to hub member 11 at 14–15 is shown in FIGS. 3 and 4, and in FIGS. 6, 7, and 8 are shown successive relations of parts as they become assembled and secured. As noted previously, the accurate location and support of the tube 10 are achieved primarily through the extended gently sloping flared surface 16 resting on similarly formed surface 15. Desirably, the inclination of this surface with respect to the central axis of the assembly is of the order of 15 degrees. The spool 14 receives a projecting end 21 of the tube 10 and is formed with a narrow bottom corresponding to the thin, flattened axial limits 22 of the tube 10. Outwardly of this surface 22 is a bevel 23 of steeper angle than the surface 16. This angle, for example, may be of a slope twice that of the surface 16, and may thus be of the order of 30 degrees with respect to the assembly axis. Corners 27–27' between surfaces 16–22 and 22–23, respectively, are preferably slightly rounded. Finally, in order to improve a bond and to assure against presentation of any snagging surface, a radially outward shoulder portion 24 extends radially beyond the projection 21 so as to assure an accurate radial-plane fit at 13–24 upon securing the tube to the hub member 11.

As noted previously, the preferred method of assembly involves the technique known as spin-welding, wherein friction developed between the surfaces 23–16 and the corresponding surfaces at 14–15 is relied upon to locally bind and consolidate the hub and tube parts 11–10.

It has been found that effective bonding, for the full circumferential and labyrinthal extent of the interfit between tube 10 and hub member 11, is achieved by first developing friction heat at tapered surfaces 15–16 to an extent that molten thermoplastic material from both surfaces is caused to develop and to mingle locally and to flow radially outwardly under the centrifugal action of rotating one (to the exclusion of the other) of members 10–11. As such molten material is locally developed, the parts are further advanced axially toward each other to close remaining clearances in the environment of molten thermoplastic material. The appearance of flash or beaded excess at the exposed corner between flange 13 and tube 10 is indicative of a full flow of molten material over all adjacent tube and hub surfaces, and this excess is easily removed by a simple cleaning-knife operation.

Referring specifically to FIG. 6, the particular configuration of surfaces 16–22–23–24 on tube 10 is shown to closely match similar surfaces 15–28–14–29 of hub member 11, the relation being such as to develop interference contact between tapered surfaces 15–16 while radial outwardly open labyrinthal clearance is established between remaining surfaces 22–23–24 and 28–14–29. This is the relation of parts as spin-welding commences.

Spin-welding may be accomplished by clamping tube 10 against rotation on a vertically oriented axis, and by placing a hub member 11 in position, resting on the tapered-cone interfit at 15–16. A rotating inertial mass is transiently axially applied to the outer face of hub member 11 (in axial alignment with tube 10 and hub member 11) to induce hub rotation while axially displacing member 11 against tube 10 as the thermoplastic material melts.

An intermediate stage of the process is illustrated in FIG. 7, for the instant when the axial clearance between surfaces 22–28 and 24–29 has substantially closed. By this time, sufficient local melt will have accumulated to fill the remaining void between surfaces 23–14, and centrifugal loss of melt will be restrained by the approach of surfaces 24–29.

Thereafter, spin-welding rotation and axial-displacement pressure continue to an extent permitting limited further local melting, mixing and fusing of hub and tube thermoplastic materials at surfaces 22–28, 14–23, and 24–29, the trapped melt in the transient void at 14–23 being compressed to assure that the entire circumferential and radial extent of the joint will be adequately served with melt to guarantee an equally full extent of the weld. The axial compression may be halted at a predetermined axial displacement by suitable stop means (not shown).

In a typical employment of the invention, an extruded tube 10 of polyacetal resin, of about three-inches diameter and ¼-in. thickness, is to be secured to a molded hub member 11 of similar material, with a finished spacing of 10 inches between opposed flange walls 29. The space between outer shoulder faces 24 is cut about 0.050-in. oversize, and the interference at 15–16 develops for an axial clearance of 0.020 to 0.040 inch at surfaces 22–28 and 24–29, there being a slightly greater axial clearance at 14–23, to permit transient local entrapment of melt, as previously explained. The controlled axial compressional advance which accompanies the spin-welding operation is continued until the desired precise flange-to-flange spacing of 10 inches is achieved. The total time required to achieve spin-welding is a matter of only a few seconds, and cooling to permanent hardness (and true welding) is virtually instantaneous. At this time, the parts have the relationship shown in FIG. 8, wherein the crossed region will be understood to designate that which has been fully circumferentially and radially fused.

The bore 25 of the boss or center part of hub member 11 is of a size to have relatively close fit with the supporting spindle (not shown) on which the spool is intended to be ultimately used. While it is possible to provide the boss portion 12 of such standard length as to meet and possibly connect with the similar part of the hub member at the other end of the assembly, this is not our purpose, and it is a feature of the invention that material is saved by not providing such connection. Since the bore 25 is to have relatively close fit with its supporting spindle, there will be relatively little angular play characterizing the fit of the parts once the spool is inserted upon a spindle end. To the extent that there is such angular play, the inner axial end of the bore 25 may be flared outwardly at 26. The extent of this flare is sufficient to more than accommodate the angular play between the spindle and the bore 25. Thus, upon applying a completed spool to a spindle, there is no chance of the end of the spindle fouling against the inner axial end of the second hub member of the applied spool.

In certain applications it is important that the spool construction be highly resistive to mechanical shock, as, for example, occasioned when dropping a loaded spool on an edge of an end flange 11. In such cases, breaks have been observed at small air pockets or voids at the region of spin-welding. To avoid this difficulty, a further refinement of the described technique has been found effective, and this constitutes the preferred embodiment of the invention. This embodiment will be described in connection with FIGS. 9, 9A, 10 and 11 in which many of the parts already described will be recognized and are therefore given the same reference numerals, expressed as numbers above 100.

Thus, in the preferred embodiment a tube 110 is to be spin-welded to the flanged hub member 111, having an annular recess defined by an inner tapered wall 115, an axial end wall 128, and an outer tapered wall 114. The mating axial end of the tubular member 110 is formed with a centering inner taper 116 matching that of the recess wall 115, with an axial end wall 122 corresponding to the axial limit of the flange recess, and with an outer taper 123 to face the outer taper 114 of the recess. The relation of these surfaces and parts is preferably such that upon initial contact, as illustrated in FIG. 9, at least the inner tapered walls 115–116 (having the same taper angle α, in the order of 15 degrees) make fullest possible contact, the clearance between end surfaces 122–128 as close as possible. The tapers of surfaces 114–123 are at different angles δ, β so as to define an outwardly expanding clearance communicating with the space D between radial faces 124–129. For the case of parts made of polyacetal resin known as Celcon M25 (a product of the Celanese Corporation of America), the expanding taper clearance is defined between surface 114 having a flare angle δ in the order of 30 degrees, and the taper surface 123 having a flare β in the order of 24 degrees; for this situation, the space D, for the initial-contact relation depicted in FIG. 9, may be in the order of 0.020 inch. The deverging clearance is in the range of 5 to 7 degrees, preferably 6 degrees, as indicated by the specific example for angles δ and β.

Upon development of spin-welding as by the technique described above, friction at the contacting surfaces develops localized melt from the bodies of both parts 110–111. This melt is subjected to centrifugal force due to spinning, and the expanding clearance between surfaces 114–123 is caused to collapse with a progressive squeezing action having a radially outward component, as far as localized melt is concerned. Thus, the squeezing action (due to collapse of this taper clearance) and the force due to centrifugal action cooperate in the same direction to assure expulsion of excess localized melt and void-free collapse of the clearance. This collapse proceeds to complete closure of the clearance D, and beyond this point so as to insure such friction development between the radial surfaces 124–129 that a secure weld is also there achieved. The result is depicted in FIG. 10 by a line of cross marks for the full area of contact between tube 110 and flange 111, and the reference-numeral designation for parts of this welded alignment follows the technique employed in FIGS. 6 to 8. There will necessarily be an excess of melt accumulated at a ring suggested by phantom outline 130, and as previously noted this excess may be easily scraped off after welding has been achieved.

It is important that, to achieve overall length dimensioning in the finished product, there be a limit stop determining the extent to which tube 110 and flange 111 will be axially pressed together during the spin-welding operation. Such a limit is schematically suggested in FIG. 11 which depicts certain elements of spin-welding apparatus. In connection with FIG. 11 it suffices to explain that the bobbin 131, having an upper end flange 132 to be spin-welded into place, is vertically located on a stem 133 secured to a base 134; base 134 will be understood to have means (not shown) for anchoring the bobbin 131 (except the flange 132 which is to be secured thereto) against rotation. Drive means 135 having keyed engagement with the flange 132 is subjected to rotation and at the same time to downward axial displacement forces, suggested by arrows 136. Downward displacement is followed by a rigid lateral arm 137 guided in a vertical stem 138 on which stop nuts 139 are positioned to determine the limit of downward displacement.

The desired limit of downward displacement during spin-welding rotation may be appreciated by a consideration of several of the longitudinal dimensions depicted in FIGS. 9 and 10, in which an arbitrary length-reference point 140 has been identified on the tube 110. Upon initial contact of the parts at axial insertion (FIG. 9), the axial distance from the reference point 140 to the axial outer end of flange 111 is designated $L_1$, being determined by the thickness of flange 113, the clearance D, and the distance $L_3$ from surface 124 on tube 110 to the arbitrary reference point 140. Upon spin-welding, to the extent represented by contact of arm 137 with stop 139, the distance from the arbitrary reference point 140 to the outer axial limit of flange 113 is designated $L_2$ (FIG. 10), which represents not only collapse of the clearance D, but also an axial retreat of the surface 124; as a result, the distance $L_4$ from reference point 140 to the flange surface 129 is less than the distance $L_3$ in FIG. 9. Typically, for the materials and dimensions stated above, this retreat, i.e., distance $L_3$ minus distance $L_4$, is in the order of 0.010 to 0.015 inch.

In FIG. 9A, there is illustrated a slight modification of the parts formation shown in FIG. 9, the departure being such as to develop an expanding taper clearance 150 between the end faces 128'–122' on the flange and tube respectively. This expanding tapered clearance expands in the radially outward direction and continues to expand at 151 in the space between tapered surfaces 123'–114'. For the materials and dimensions already stated, the taper of this clearance is 5 to 7 degrees, preferably 6 degrees. All other parts are the same as have already been described and, of course, the purpose of communicating expanding tapered clearances 150–151 is to permit squeezing action and centrifugal action to cooperate even more fully as melting progresses during spin-welding.

It will be seen that we have described an improved spool construction of the character indicated, possessing many desirable features over prior constructions and over efforts at solving the problem of making such spools of thermoplastic material. In particular, the construction involves no shrinkage problem because the overall length between flanges 13 of the hub members 11 depends solely upon the cut-off length of the extruded tubing 10 and upon the precision control of axial displacement during spin-welding. This length control may be accurately achieved by precise cut-off and end-forming techniques applied to the extruded tubing, the surfaces 24 (or 124) being slightly over-spaced as indicated in the foregoing specific examples. Since the critical length is thus determined basically by a cut-off operation on extruded tubing, the structure lends itself to fabricating many spool sizes with the same basic parts, in that, for a given tube diameter, merely the cut-off length need be changed from one construction to the next. The particular hub configuration lends itself to molding in which removable inserts or pockets in the mold determine various diameters of the grooves 14 and thus various tube diameters that may be accommodated. The same may be said of the outer diameter of the flange 13, so that the same basic mold can be employed to produce a variety of hub-member configurations with a corresponding variety of completed spool sizes. Thus, our construction makes possible great savings through reduced tooling costs, and as a matter of fact the tooling cost even for producing a single size and type of spool, is about one-third that of an all-molded construction; such economies are achieved without the noted disadvantages of the all-molded construction. By employing thin-walled extruded tubing, it is possible to produce spools of substantially less weight for easier handling and to achieve low mass, for high-speed rotation and for ease of acceleration and deceleration. Great weight is saved by avoiding a continuous bore for receiving the spindle, and extreme economies are realized both in the spool cost and in the cost of machines to handle the spools.

While the invention has been described in detail for the forms shown, it will be understood that modifications may be made within the scope of the invention as described.

We claim:

1. In roll or the like construction, an elongated continuously extruded hollow cylindrical tube of thermoplastic material, each axial end of said tube comprising a circumferentially continuous radially directed abutment face, said face being radially adjacent a circumferentially continuous axial projection defining the axial end of said tube, the bore of said tube at both ends being outwardly flared, and two spaced hubs of thermoplastic material, each hub having a central boss for reception and location of an inserted spindle or shaft, said hubs each being annularly recessed with a circumferentially continuous contour substantially matching that of the tube projection received therein, and each of said hubs having a flared bore-supporting surface engaging a flared end of the bore of said tube, said hubs each also having axially outwardly of said tube ends a radially extending portion constituting a circumferentially continuous abutment for axial location of said tube at the adjacent abutment face thereof, the axial location of the hub flare with respect to said radially extending portion being such that when said tube flare and hub flare are engaged there is an axial-clearance relation between said projection and said recess, thermoplastic material from said hubs and tube permanently welding said hubs and tube together at the fit of said projecting ends into said recesses, said thermoplastic material being melted to effect the welding by relatively rotating said engaged hubs and tube.

2. The method of fabricating a snag-proof traverse spool or the like, which comprises extruding a length of hollow cylindrical tube of thermoplastic material, cutting a circumferentially continuous radial shoulder at each end of a desired tube length, thereby defining a continuous annular projection axially outwardly of both shoulders, molding two flanged hub members of thermoplastic material each with a central boss and with concentric axially facing grooves to receive, support and concentrically locate said tube on said hub members with said projections received in said grooves, the bore of said tube at both ends being outwardly flared and the adjacent parts of said hub members being similarly flared, there being initial axial interfering engagement of said flared parts of said tube and hub members at an axial location establishing an axial-clearance relation between said radial shoulders and the axially adjacent parts of said flanged hub members, and spin-welding said hub members to the respective projecting ends of said tube by frictionally melting said material at said flared portions and axially displacing said hub members inwardly against said tube until said shoulders fuse in axial locating relation with the flanges of said hub members to complete the permanent concentric assembly of said tube and hub members.

3. A construction according to claim 1, in which the flare angles of said bore-supporting surface and of the flared end of the bore of said tube are substantially the same, in which said axial-clearance relation is minimal, and in which upon initial contact of said flared surfaces the radially outer surfaces of said recess and of said tube projection define an annular clearance which expands with at least a component in the radially outward direction.

4. The construction of claim 3, in which said flare angles are substantially 15 degrees with respect to the axis of said tube.

5. The construction of claim 3, in which said radially outer surfaces of said recess and of said tube projection are tapered at different angles with respect to the axis of said tube, the difference between said angles being in the range of 5 to 7 degrees.

6. The construction of claim 3, in which said radially outer surfaces of said recess and of said tube projection are tapered at different angles with respect to the axis of said tube, the difference between said angles being substantially 6 degrees.

7. The construction of claim 3, in which the adjacent surfaces of said recess and of said tube projection diverge from each other in the generally radially outward direction commencing substantially at the point of innermost axial penetration of said projection in said recess.

8. The construction of claim 3, in which the adjacent surfaces of said recess and of said tube projection diverge from each other in the generally radially outward direction commencing substantially at the inner axial limit of said flared bore-supporting surface.

9. The method of fabricating a snag-proof traverse spool or the like, which comprises extruding a length of hollow cylindrical tube of thermoplastic material, cutting a circumferentially continuous radial shoulder at each end of a desired tube length, thereby defining a continuous annular projection axially outwardly of both shoulders, molding two flanged hub members of thermoplastic material each with a central boss and with concentric axially facing grooves to receive, support and concentrically locate said tube on said hub members with said projections received in said grooves, the bore of said tube at both ends being outwardly flared and the adjacent parts of said hub members being similarly flared, these being initial axial interfering engagement of said flared parts of said tube and hub members at an axial location establishing an axial-clearance relation between said radial shoulders and the axially adjacent parts of said flanged hub members, adjacent surfaces of said projections and of said hub members being similarly flared, there being generally radially outward direction commencing substantially at the point of intermost axial penetration of said projections in their respective grooves, such divergence constituting a clearance expanding as it approaches communication with said axial clearance, and spin-welding said hub members to the respective projecting ends of said tube by frictionally melting said material at said flared portions and axially displacing said hub members inwardly against said tube to progressively collapse the clearance between said divergent surfaces until said shoulders fuse in axial locating relation with the flanges of said hub members to complete the permanent concentric assembly of said tube and hub members.

References Cited

UNITED STATES PATENTS

| 2,643,830 | 6/1953 | Paeplow et al. | 242—118.61 |
| 2,682,380 | 6/1954 | Caldwell et al. | 242—118.61 |
| 3,120,570 | 2/1964 | Kennedy et al. | 264—68 X |

GEORGE F. MAUTZ, Primary Examiner

U.S. Cl. X.R.

264—68